United States Patent [19]

Kuwabara et al.

[11] Patent Number: 4,883,568

[45] Date of Patent: Nov. 28, 1989

[54] FINISHING METHOD EMPLOYING ELECTRO-CHEMICAL PROCESS

[75] Inventors: Yohei Kuwabara, Fukuroi; Teruo Asaoka, Kakegawa, both of Japan

[73] Assignee: Shizuoka Seiki Co., Ltd., Shizuoka, Japan

[21] Appl. No.: 285,853

[22] Filed: Dec. 16, 1988

[30] Foreign Application Priority Data

Feb. 13, 1988 [JP] Japan .................................. 63-31499

[51] Int. Cl.[4] ............................................... B23H 3/00
[52] U.S. Cl. ............................ 204/129.43; 204/129.5; 204/DIG. 9
[58] Field of Search ......... 204/129.43, 129.5, DIG. 9, 204/225

[56] References Cited

U.S. PATENT DOCUMENTS 4,160,710 7/1979 Greenwood ............... 204/129.43 X
4,264,417 4/1981 Vasiliev et al. ............. 204/129.5 X
4,800,006 1/1989 Kuwabara et al. ........... 204/DIG. 9

Primary Examiner—Donald R. Valentine
Attorney, Agent, or Firm—Flynn, Thiel, Boutell & Tanis

[57] ABSTRACT

A finishing method employing electro-chemical process includes the steps of: supplying identical pulses between an electrode and a workpiece disposed opposite to each other in a stationary electrolyte with a predetermined gap therebetween; reducing the gap after the pulses have been supplied; thereafter enlarging the gap; and injecting electrolyte into the gap during the step of enlarging the gap.

1 Claim, 4 Drawing Sheets

FINISHING METHOD EMPLOYING ELECTRO-CHEMICAL PROCESS

FIELD OF THE INVENTION

The present invention relates to a finishing method employing electro-chemical process and, more particularly, to such a finishing method which is capable of finishing a three-dimensional surface to be finished within a short time and with a high level of precision.

BACKGROUND OF THE INVENTION

An electro-chemical finishing method which has been referred to as a metal finishing method is disclosed in, for example, Japanese Patent Laid-Open Publication No. 255013/1987. This electro-chemical machining method involves supporting an electrode and workpiece opposite to each other with a predetermined gap therebetween, and finishing the workpiece by repeating in an alternating manner the supply of a direct current between the electrode and workpiece and the injection of electrolyte into the gap.

With the above-described electro-chemical finishing method, however, disadvantages are encountered because, in this method, after the supply of direct current, electrolytic products generated between the poles are expelled by raising the electrode from the position in which the direct current was supplied and by injecting electrolyte through holes formed in the electrode.

Namely, if electric-discharge die sinking is performed using the electrode or workpiece having a through hole for injecting electrolyte, although the workpiece is in general processed or finished over a large area, electrolytic products produced from the workpiece and present in the gap cannot be expelled simply by raising the electrode and injecting electrolyte after supplying direct current, thereby making it difficult to replace the contaminated electrolyte in the gap with fresh electrolyte. As a result, part of the contaminated electrolyte remains in the gap, causing a variation in the finishing conditions for various portions of the surface of the workpiece to be finished. As a result, the required finishing is hindered, the dimensions are varied and the improvement of the surface roughness is delayed. As a result, it is impossible to obtain within a short time a glossy surface having a highly precise surface quality.

Therefore, an object of the present invention is to provide a finishing method employing an electrochemical process which is capable of limiting variation in dimension regardless of the size and configuration of the surface of the workpiece to be finished, and which is capable of improving the surface roughness of the workpiece surface, the method being thus capable of stably providing a glossy surface having a highly precise surface quality within a short time.

SUMMARY OF THE INVENTION

In order to achieve the above-stated object, the method according to the invention includes the steps of: supplying identical pulses between an electrode and a workpiece disposed opposite to each other and immersed in a stationary electrolyte with a predetermined gap therebetween; reducing the gap after the pulses have been supplied; thereafter increasing the gap; and injecting electrolyte into the gap while increasing the gap.

With the arrangement of the present invention, since the electrode is lowered to reduce the gap after supplying pulses, the pressure resulting from this action causes part of electrolytic products within the gap to be expelled to the outside of the gap. Further, since the electrode is raised from a condition of a reduced gap, the speed of electrolyte flow over the surface of the workpiece is increased so that dross, such as electrolytic products, adhering to the work surface is removed. The dross thus removed is expelled to the outside of the gap while the electrolyte is injected into the gap. In this way, the contaminated electrolyte within the gap can be replaced with fresh electrolyte.

BRIEF DESCRIPTION OF THE DRAWINGS

Two embodiments of the present invention will be described below in detail with reference to the drawings, in which.

DETAILED DESCRIPTION

Figure 1:
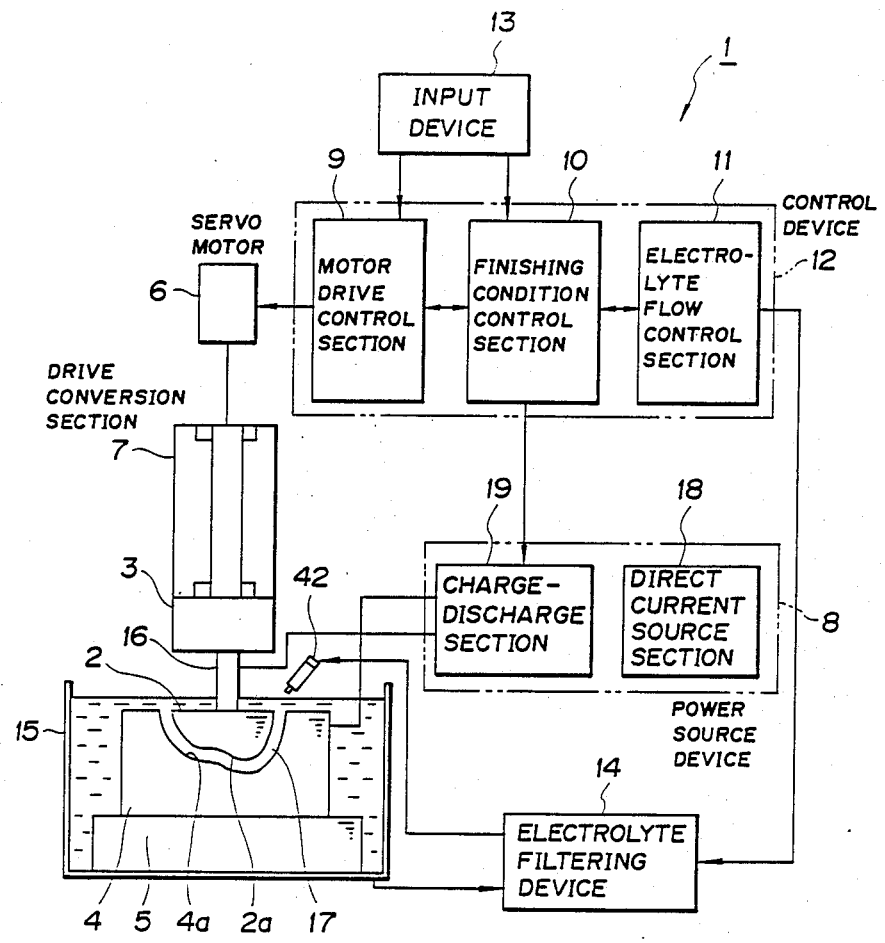
FIG. 1 is a block diagram of an apparatus for performing electro-chemical finishing in accordance with the present invention.

In the drawings, reference numeral 1 designates an electro-chemical finishing apparatus, 2 an electrode, 4 a workpiece, 8 a power source device, 9 a motor drive control section, 10 a machining condition control section, 11 an electrolyte flow control section, 12 a control device, 13 an input device, 14 an electrolyte filtering device, 17 a gap, and 39 a CPU.

FIGS. 1 to 4 illustrate an embodiment of the present invention. Referring to FIG. 1, an electro-chemical finishing apparatus 1 which is suitable for carrying out the present invention includes an electrode fitting device 3 for supporting an electrode 2, a workpiece fitting device 5 for supporting a workpiece 4, a drive conversion section 7 for converting the rotary movement of a servomotor 6 into reciprocal movement, a power source device 8 for generating pulses, a control device 12 having a motor drive control section 9, a finishing condition control section 10 and an electrolyte flow control section 11, an input device 13 for inputting various data concerning the workpiece 4, an electrolyte filtering device 14 for filtering the electrolyte, and a finishing tank or bath 15.

The electrode fitting device 3 has a rod 16 provided at a lower portion thereof, and the electrode 2 which, for example can be formed with pure copper or graphite, is fitted to the lower end of the rod 16 so that a three-dimensional surface 2a of the electrode and a congruent three-dimensional surface 4a of the workpiece 4 to be finished have a uniform gap 17 therebetween. The electrode fitting device 3 is moved vertically by rotation of the servomotor 6 (which in turn is controlled by control signals from the motor drive control section 9) so as to set the gap 17 between the electrode surface 2a and the surface 4a to a predetermined value.

The work fitting device 5 comprises a table made of a highly insulating material, such as granite or a ceramic material. The workpiece 4, which has been machined, for example, with electric discharge die sinking, is mounted on the top surface of the device 5 by means of conventional setting jigs, screws or the like (which are not shown).

Figure 2:
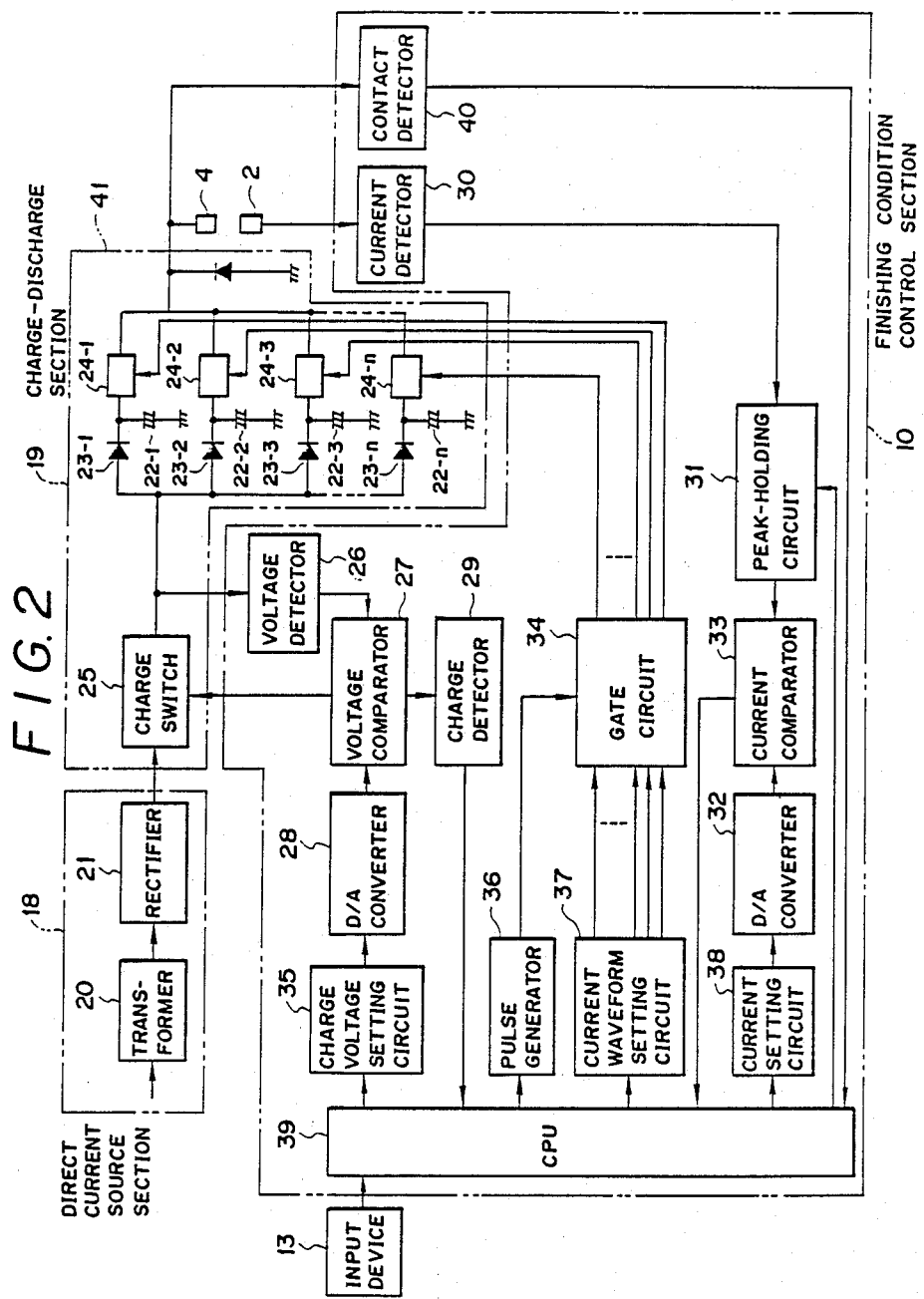
FIG. 2 is a block diagram of certain essential parts of the apparatus of FIG. 1.

The power source device 8 for supplying predetermined pulse current between two poles namely the electrode 2 and workpiece 4 and the machining condition control section 10 for controlling the power source device 8 are arranged as shown in FIG. 2.

The power source device 8 comprises a direct current source section 18 and a charge-discharge section 19. The direct current source section 18 comprises a transformer 20 and a rectifier 21, through which an alternating current voltage is stepped down to a predetermined value with the transformer 20 and is then rectified with the rectifier 21, thereby obtaining direct current to be supplied to capacitors 22-1 to 22-n described later.

The charge-discharge section 19 comprises a plurality of capacitors 22-1 to 22-n for discharging charge between the poles, diodes 23-1 to 23-n which are respectively connected to capacitors 22-1 to 22-n for preventing reverse flow of the charge, discharging switches 24-1 to 24-n which are opened or closed so as to discharge the charge to the discharging side, and a charging switch 25 for applying or interrupting the supply of power from the direct current source section 18 so as to charge each of the capacitors 22-1 to 22-n with a predetermined voltage.

The finishing condition control section 10 comprises a voltage detector 26 for detecting the charge voltage value of the capacitors 22-1 to 22-n, a voltage comparator 27 for comparing the charge voltage value detected with the voltage detector 26 with the value of an output from a D/A (digital to analog) converter 28, a charge detector 29 for detecting the completion or start of the charging of the capacitors 22-1 to 22-n on the basis of signals output from the voltage comparator 27, a current detector 30 for detecting the current value of the charge discharged between the poles, a peak-holding circuit 31 for holding the peak value of the current value detected with the current detector 30, a current comparator 33 for comparing the peak current value held with the peak-holding circuit 31 with the value of an output from a D/A (digital to analog) converter 32, a gate circuit 34 for outputting respective open/close drive signals to each of the discharge switches 24-1 to 24-n on the basis of respective signals which come from a pulse generator 36 with each of which having a predetermined duration and on the basis of a signal from a current waveform setting circuit 37 for setting the current waveform of charge to be discharged between the poles, a charge voltage setting circuit 35 for setting a charge voltage value to be supplied to each of the capacitors 22-1 to 22-n and for outputting a signal indicative of the set value to the D/A converter 28, a current setting circuit 38 for setting a current which is to flow between the poles and for outputting a signal indicative of the set value to the D/A converter 32, a CPU (central processing unit) 39 for computing and processing finishing conditions on the basis of, for instance, data input through the input device 13, and a contact detector 40 for detecting physical contact between the electrode 2 and workpiece 4. Reference numeral 41 in the figure denotes a diode for preventing the discharge switches 24-1 to 24-n from being damaged with a counter electromotive force.

The input device 13 is provided for inputting various data regarding the workpiece 4, such as an area S to be finished and removal depth, machining conditions, etc. The electrolyte filtering device 14 comprising, for instance, a centrifugal separator, an electrolyte temperature adjuster, a filter, a solenoid valve and the like (none of which are illustrated), is arranged to filter an electrolyte containing electrolytic products generated during finishing and to inject, based on the control signals from the electrolyte flow control section 11, filtered fresh electrolyte into the gap 17 through an injection nozzle 42 (FIG. 1) directed toward the gap 17.

Figure 3:
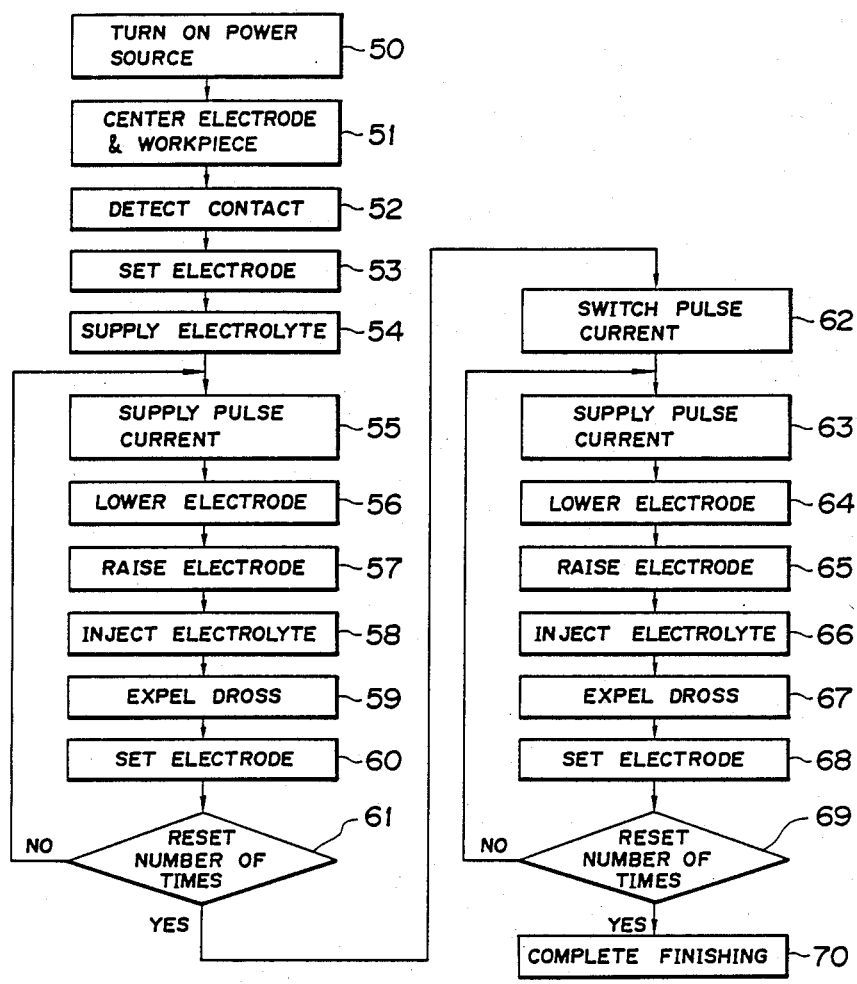
FIG. 3 is a flowchart showing an example of a finishing operation according to the invention.

Next, an example of a finishing operation performed with the electro-chemical finishing apparatus 1 will be explained with reference to the flowchart shown in FIG. 3.

When a finishing operation is to be performed, an electrode 2, for example one which was previously used during electric discharge die sinking of the workpiece 4, is fitted to the lower end of the rod 16 of the electrode fitting device 3. The workpiece 4 is fitted to the workpiece fitting device 5. The power source of the electrochemical finishing apparatus 1 is turned on (Step 50), and the electrode 2 and the workpiece 4 are centered (Step 51).

After the centering process, a machining process is started. The electrode 2 is lowered into contact with the workpiece 4. When the point of contact therebetween is detected with the contact detector 40 (Step 52), the CPU 39 stores that point as a working reference point A. Subsequently, the electrode 2 is raised to a position in which an electrode gap δ, which has been input through the input device 13, is maintained (Step 53). Thereafter, the electrolyte supply device 14 is operated to supply an electrolyte into the gap 17 (Step 54).

When the electrolyte supplied to the gap 17 has become stationary (or in other words is in a state in which its flow and movement have stopped), predetermined identical current pulses for improving the surface roughness are supplied (Step 55), the identical current pulses having characteristics corresponding to the working area S of the workpiece 4, and in particular each having, for instance, a peak current density of 30 to 50 A/cm$^2$ and a pulse-on duration of 2 to 10 msec. When the pulse current has been turned off, the electrode 2 is lowered (Step 56) into contact with the workpiece 4; thereafter, the electrode is raised (Step 57) again.

Figure 4:
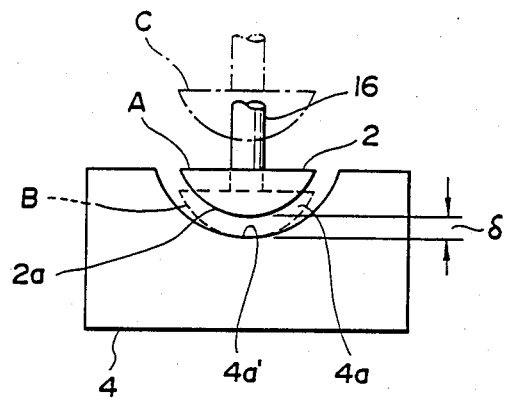
FIG. 4 is a diagrammatic view depicting the movement of an electrode which is a component of the apparatus of FIG. 1.

The movement of the electrode 2 in the steps 55 to 57 will be described in detail with reference to FIG. 4. The identical current pulses are supplied with the electrode 2 in the condition in which it opposes the workpiece 4 with the predetermined gap δ therebetween (that is, the position A shown in solid lines in the figure). Substantially simultaneously with turning off of the pulse current, the servomotor 6 is rotated with a control signal from the control device 12, so as to lower the electrode 2 and bring the surface 2a into contact with the working surface 4a of the workpiece 4 (that is, the position B shown in broken lines in the figure). When this contact is detected with the contact detector 40, the servomotor 6 is rotated with a control signal from the control device 12 so as to raise the electrode 2 (that is, to bring it to the position C shown in broken lines in the figure).

When the gap has enlarged and become greater than by raising the electrode effected in Step 57, fresh electrolyte is injected into the gap with the electrolyte filtering device 14 through the nozzle 42 (Step 58), so as to expel working dross (such as electrolytic products) which has been produced by the supply of pulse current and which is contained in the electrolyte (Step 59). The injection of the electrolyte is effected substantially simultaneously with the raising of the electrode effected in Step 57. When the electrolytic products have been expelled, the electrode 2 is lowered and is set at a position corresponding to that set in Step 53 (i.e., at the position A shown in FIG. 4) (Step 60). Subsequently, it is judged whether or not the machining sequence for the purpose of improving the surface roughness has been repeated predetermined number of times (Step 61).

After the machining comprising a series of the above-described processes has been repeated predetermined number of times, the pulse current supplied from the power source device 8 is switched, in response to a control signal from the control device 12, to be identical current pulses for forming a glossy surface, for instance identical current pulses each having a peak current density of 30 to 50 A/cm$^2$ and a pulse-on duration of 20 to 60 msec (Step 62). Thereafter, machining which comprises step 63 to 68 corresponding to the above-described steps 55 to 60 is repeated predetermined number of times (Step 69), thereby obtaining a glossy surface. This completes the entire finishing (Step 70).

As described above, with the finishing method employing electro-chemical machining in accordance with the present invention, pulse current is supplied between the poles, the electrode 2 is lowered substantially simultaneously with the turning-off of the pulse current until the electrode is brought into contact with the workpiece 4 so as to reduce the gap, electrode 2 is thereafter raised to enlarge the gap, and electrolyte is injected into the gap. Therefore, the speed of flow over the surface of the workpiece 4 is increased during the raising of the electrode, and the flow speed thus increased makes it possible to reliably remove dross from the surface of workpiece 4, especially the dross present in the deepest portion 4a' (see FIG. 4) of a recess in the workpiece 4, the removal of which traditionally tended to be difficult. The working dross thus removed can be expelled from the gap by injecting fresh electrolyte, thereby enabling the electrolyte within the gap to be replaced by fresh electrolyte. This feature of the present invention facilitates its application to a workpiece having a large working area.

Figure 5:
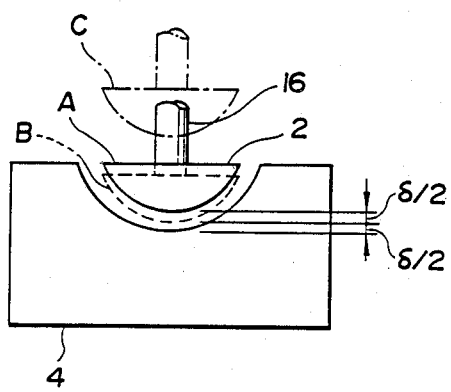
FIG. 5 is a diagrammatic view similar to FIG. 4 and showing an alternative way of moving the electrode.

Although in the foregoing embodiment, after the pulse current has been turned off, the electrode 2 is lowered until it comes into contact with the workpiece 4, the present invention is not limited thereto. Alternatively, the electrode may be lowered, for instance to a position corresponding to ½ of the set gap δ as shown in FIG. 5, and then raised. The position of the raised electrode 2 can be set suitably in accordance with the size of the workpiece 4.

Further, although in the foregoing embodiment the reduction or enlargement of the gap between the electrode 2 and workpiece 4 is effected by raising or lowering the electrode 2, an alternative arrangement may be adopted in which the workpiece 4 is raised or lowered, or in which the electrode 2 and workpiece 4 are both moved relatively. Still further, the injection of electrolyte into the gap may be effected substantially simultaneously with the lowering of the electrode effected after the supply of pulses.

As described above in detail, in the finishing method employing electro-chemical process in accordance with the present invention, after pulses have been turned off, the electrode is lowered so as to reduce the gap between the electrode and the workpiece, the electrode is thereafter raised, and electrolyte is injected into the gap. Therefore, it is possible to increase the speed of flow of the electrolyte during the raising of the electrode, thereby removing dross and the like from the workpiece surface. The dross is then expelled outside the gap by the electrolyte being injected. Accordingly, dross within the gap can be positively expelled even if the finished area of the workpiece is large, thereby making it possible to make the finishing condition uniform over the entire finishing area. Thus, the effect of the present invention includes the effect that a glossy surface or the like having a highly precise surface quality can be obtained within a short period, and the mold manufacturing industry which has not recently seen much progress in labor saving can now achieve a considerable improvement in quality and mechanization.

We claim:

1. A finishing method employing electro-chemical process, comprising the steps of: supplying identical electrical pulses between an electrode and a workpiece disposed opposite to each other in a stationary electrolyte with a predetermined gap therebetween; reducing said gap after said pulses have been supplied; thereafter enlarging said gap; and injecting electrolyte into said gap at least during said step of enlarging said gap.

* * * * *